United States Patent [19]
Satorius

[11] Patent Number: 6,151,427
[45] Date of Patent: Nov. 21, 2000

[54] TUNABLE OPTIC FIBER BANDPASS FILTER USING FLEXURAL ACOUSTIC WAVES

[75] Inventor: Duane A. Satorius, Silver Spring, Md.

[73] Assignee: The United States of America as represented by the National Security Agency, Washington, D.C.

[21] Appl. No.: 09/294,390

[22] Filed: Apr. 20, 1999

[51] Int. Cl.[7] ................................................. G02F 1/335
[52] U.S. Cl. .................................. 385/7; 385/28; 385/29
[58] Field of Search .............................. 385/1, 7, 27, 28, 385/29, 37, 123, 10

[56] References Cited

U.S. PATENT DOCUMENTS

| | | |
|---|---|---|
| 5,007,705 | 4/1991 | Morey et al. . |
| 5,652,808 | 7/1997 | Duchet et al. ............................. 385/7 |
| 6,021,237 | 2/2000 | Kim et al. ................................. 385/28 |
| 6,052,497 | 4/2000 | Graebner .................................... 385/7 |

OTHER PUBLICATIONS

Helge E. Engan et al., "Propagation and Optical Interaction of Guided Acoustic Waves in Two–Mode Optical Fibers," IEEE J.O.L.T., vol. 6, No. 3 Mar. 1998, pp. 428–436.

T.A. Birks, et al., "Four–Port Fiber Frequency Shifter with a Null Taper Coupler," Optics Letters, vol. 19, No. 23, Dec. 1, 1994, pp. 1964–1966 Plus Errata Sheet.

Seok Hyun Yun, et al., "All–Fiber Tunable Filter and Laser Based on Two–Mode Fiber", Optics Letters, vol. 21, No. 1, Jan.1, 1996, pp. 27–29.

Seok Hyun Yun et al., "Suppression of Polarization Dependence in a Two–Mode–Fiber Acousto–Optic Device," Optics Letters, vol. 21, No. 12, Jun. 15, 1996, pp. 908–910.

Hyo Sang Kim et al., "All–Fiber Acousto–Optic Tunable Notch Filter with Electronically Controllable Spectral Profile," Optics Letters, vol. 22, No. 19, Oct. 1, 1997 pp. 1476–1478.

Y.W.Kon et al., "Broadband Polarization–Insensitive All–Fiber Acousto–Optic Modulator," OFL '98, Feb. 22–27, 1998, San Jose, CA., pp. 239–240.

D.S. Starodubov et al., "All–Fiber Bandpass Filter with Adjustable Transmission Using Cladding–Mode Coupling," IEEE Photonics Tech. Letters, vol. 10, No. 11, Nov. 1998, pp. 1590–1591.

*Primary Examiner*—Hemang Sanghavi
*Attorney, Agent, or Firm*—Robert D. Morelli

[57] ABSTRACT

The present invention is a tunable optic fiber bandpass filter using flexural acoustic waves that includes an optic fiber; a first silica horn; a first acoustic transducer; a first signal generator; a first acoustic absorber; a core blocker; a second acoustic absorber; a second silica horn; a second acoustic transducer; and a second signal generator. The method of the present invention is receiving an optic signal in a core of an optic fiber; inducing a first flexural acoustic wave in the optic fiber where there is no buffer coating; absorbing the first flexural acoustic wave after it has traveled a distance down the optic fiber; causing user-definable wavelengths of the optic signal to exit the core and enter the cladding of the optic fiber; blocking wavelengths of the optic signal that remain in the core of the optic fiber; inducing a second flexural acoustic wave in the optic fiber where there is no buffer coating; absorbing the second flexural acoustic wave after it has traveled a distance down the optic fiber; and causing user-definable wavelengths of the optic signal to exit the cladding and enter the core of the optic fiber. One signal generator may be used to induce both flexural acoustic waves. In an alternate embodiment, one absorber may be used.

24 Claims, 3 Drawing Sheets

TUNABLE OPTIC FIBER BANDPASS FILTER USING FLEXURAL ACOUSTIC WAVES

FIELD OF THE INVENTION

The present invention relates, in general, to optics systems and elements and, in particular, to optical communication.

BACKGROUND OF THE INVENTION

A step index optic fiber consists of a core, a cladding around the core, and a buffer coating around the cladding. The core is fabricated to obtain an index of refraction slightly greater than that of the cladding. Furthermore, the buffer coating, which may be plastic, is fabricated to obtain an index of refraction greater than that of the cladding.

Light may be transmitted along the core with little loss of light. A step index optic fiber is commonly referred to as a single-mode fiber because the original intent was to transmit light in a single way, or mode, through the core.

With the buffer coating in place, any light that escapes the core due to bending or other means enters the cladding and is absorbed by the buffer coating and lost. If the buffer coating is removed, light may enter the cladding and be transmitted in a number of ways, or modes, through the uncoated cladding depending on the angle of the light entering the cladding. Any light in the cladding surrounded by the buffer coating will be lost due to absorption.

Band-elimination filters have been realized by causing certain wavelengths of light to be eliminated, or removed, to exit the core and enter the cladding. Once these wavelengths encounter the buffer coating, they will be removed by eliminating total internal reflection thereby allowing light in the cladding to pass into and out of the buffer coating. Physical gratings have been impressed into optic fibers to cause light of a particular wavelength in the core to enter the cladding and be removed. Microbending of the optic fiber is another approach for causing light of a particular wavelength to exit the core and enter the cladding. It is also known that an acoustic wave may be applied to an optic fiber to cause light of a particular wavelength in the core to enter the cladding and be removed.

An acoustic wave may be induced in an optic fiber by applying an alternating current (AC) electrical signal to an acoustic (e.g., piezoelectric) transducer attached to a horn which is further attached to the cladding of the optic fiber. The horn focuses the acoustic energy generated by the acoustic transducer onto the optic fiber. The horn is made of a material that matches the acoustic impedance of the optic fiber. Typically, fused silica is used as the horn. The horn is attached to the optic fiber using glue. The buffer coating is removed to allow light to be transmitted via the cladding modes for the length that the buffer coating is removed. An acoustic wave induced in an optic fiber causes the fiber to flex at a frequency equal to the frequency of the modulating electrical signal applied to the acoustic transducer. The flexural acoustic wave propagates along the optic fiber with low loss if the optic fiber remains straight.

In an article by Helge E. Engan et al., entitled "Propagation and Optical Interaction of Guided Acoustic Waves in Two-Mode Optical Fibers," published by the Institute of Electrical and Electronics Engineers, Inc. (IEEE) in *The Journal Of Lightwave Technology*, March 1988, Vol. 6, No. 3, pp. 428–436, it is disclosed that a flexural acoustic wave may be induced in a optic fiber using a glass rod and an acoustic transducer. FIG. 1 is an illustration of the device 1 of this article, where a silica horn 2 is attached to an optic fiber 3. Typically, an optic fiber 3 includes a core (not shown), a cladding (not shown) over the core, and a buffer coating 4 over the cladding. The optic fiber 3 does not include a buffer coating 4 over which it is desired to induce a flexural acoustic wave. The silica horn 2 is attached to, and driven by, an acoustic transducer 5. The acoustic transducer 5, which may be a piezoelectric device, is controlled electronically by a signal generator 6.

The device 1 may be operated by applying an optic signal to the core of the optic fiber 3. A flexural acoustic wave may be induced in the optic fiber 3 by the silica horn 2 under control of the acoustic transducer 5 and the signal generator 6. The frequency of the signal generator 6 determines which wavelengths of the optic signal exit the core and enter the cladding. Any part of the optic signal in the cladding and in contact with the buffer coating 4 is eliminated by causing the cladding mode light to escape.

U.S. Pat. No. 5,007,705, entitled "VARIABLE OPTICAL FIBER BRAGG FILTER ARRANGEMENT," discloses a filter that uses a permanent Bragg grating and a grating induced by a flexural acoustic wave to eliminate unwanted wavelengths in an optic signal. The present invention does not use a permanent Bragg grating or a flexural acoustic wave to eliminate unwanted wavelengths. U.S. Pat. No. 5,007,705 is hereby incorporated by reference into the specification of the present invention.

In an article by T. A. Birks et al., entitled "Four-port fiber frequency shifter with a null taper coupler," published by the IEEE in *Optics Letters*, Dec. 1, 1994, Vol. 19, No. 23, pp. 1964–1966 and in a correction published by the IEEE in *Optics Letters*, Feb. 1, 1995, Vol. 21, No. 3, page 231, it is disclosed that a flexural acoustic wave may be induced in a optic fiber using a glass horn and an acoustic transducer to eliminate unwanted wavelengths in an optic signal to realize various filters. The present invention does not use a flexural acoustic wave to eliminate unwanted wavelengths.

In an article by Seok Hyun Yun et al., entitled "All-fiber tunable filter and laser based on two-mode fiber," published by the IEEE in *Optics Letters*, Jan. 1, 1996, Vol. 21, No. 1, pp. 27–29, it is disclosed that a flexural acoustic wave may be induced in an optic fiber using an in-line coaxial glass horn and an acoustic transducer to eliminate unwanted wavelengths in an optic signal. The present invention does not use a flexural acoustic wave to eliminate unwanted wavelengths. FIG. 2 is an illustration of the device 20 of this article, where a silica horn 21 is attached in-line to an optic fiber 22 which does not include a buffer coating 23 for the same reason as in FIG. 1. The silica horn 21 of FIG. 2 is attached to, and driven by, an acoustic transducer 24. The acoustic transducer 24 is controlled electronically by a signal generator 25. The device 20 operates as does the device 1 of FIG. 1. Putting the silica horn 21 in line with the optic fiber 22 makes the device 20 more durable than the device 1 of FIG. 1.

In an article by Seok Hyun Yun et al., entitled "Suppression of polarization dependence in a two-mode-fiber acoustic-optic device," published by the IEEE in *Optics Letters*, Jun. 15, 1996, Vol. 21, No. 12, pp. 908–910, it is disclosed that a flexural acoustic wave may be induced in an optic fiber using an in-line glass horn and an acoustic transducer to eliminate unwanted wavelengths in an optic signal. The present invention does not use a flexural acoustic wave to eliminate unwanted wavelengths.

In an article by Hyo Sang Kim et al., entitled "All-fiber acousto-optic tunable notch filter with electronically controllable spectral profile," published by the IEEE in *Optics*

*Letters*, Oct. 1, 1997, Vol. 22, No. 19, pp. 1476–1478, it is disclosed that a flexural acoustic wave may be induced in an optic fiber using an in-line glass horn and an acoustic transducer to eliminate unwanted wavelengths in an optic signal. The present invention does not use a flexural acoustic wave to eliminate unwanted wavelengths.

In an article by Y. W. Koh et al., entitled "Broadband polarization-insensitive all-fiber acousto-optic modulator," published by the Optical Society of America in the *Optical Fiber Conference '98 Technical Digest*, Feb. 22, 1998, pp. 239–240, it is disclosed that a flexural acoustic wave may be induced in an optic fiber using an in-line glass horn and an acoustic transducer to eliminate unwanted wavelengths in an optic signal. The present invention does not use a flexural acoustic wave to eliminate unwanted wavelengths.

An article by D. S. Starodubov et al., entitled "All-Fiber Bandpass Filter with Adjustable Transmission Using Cladding-Mode Coupling," published by the IEEE in *IEEE Photonics Technology Letters*, November, 1998, Vol. 10, No. 11, pp. 1590–1591, discloses, as illustrated in FIG. 3, a bandpass filter 30 that includes an optic fiber 31 without a buffer coating, a first fixed grating 32, a blocker of optic signals 33, a cladding mode modulator 34, and a second fixed grating 35. The first fixed grating 32 induces wanted wavelengths of an optic signal in the core of the optic fiber 31 to enter the cladding of the optic fiber 31. The blocker of optic signals 33 is within the core of the optic fiber 31 and blocks the unwanted wavelengths in the core from propagating any further. The cladding mode modulator 34 impress a signal upon the cladding of the optic fiber 31 to cause losses in, and decreased transmission through, the cladding. The second fixed grating 35 induces the wanted wavelengths in the cladding to enter the core. The device 30 has the disadvantages of having a fixed wavelength selectability, allowing only one wavelength to pass at a time, requiring the two gratings 32, 35 to be identical which is difficult to do, requiring mechanical movement of the cladding mode modulator 34, and suffering from a high insertion loss of 2 dB. The present invention does not suffer from these disadvantages and does not use two fixed gratings 32, 35 or a mechanical cladding mode modulator 34.

SUMMARY OF THE INVENTION

It is an object of the present invention to pass a user-definable band of wavelengths of an optic signal with an insertion loss as low as 0.2 dB using flexural acoustic waves in an optic fiber to select the wanted wavelengths.

It is another object of the present invention to pass a user-definable band of wavelengths of an optic signal with an insertion loss as low as 0.2 dB using flexural acoustic waves to select the wanted wavelengths and the amount of light to be passed.

It is another object of the present invention to pass a user-definable number of bands of wavelengths of an optic signal with an insertion loss as low as 0.2 dB using flexural acoustic waves to select which wavelength bands to be passed and the amount of light to be passed for each wavelength band.

The present invention is a tunable optic fiber bandpass filter using flexural acoustic waves. The preferred bandpass filter includes a step index optic fiber that includes a core, a cladding around the core, and no buffer coating over portions of the optic fiber where bandpass filtering takes place.

A first silica horn is attached to the optic fiber where there is no buffer cladding.

A first acoustic transducer is connected to the base of the first silica horn.

A first signal generator is connected to the first acoustic transducer.

A mechanical vibration of the first acoustic transducer induces a first flexural acoustic wave in the optic fiber via the first silica horn that is the same frequency of the radio frequency (RF) electrical signal of the first signal generator. The first flexural acoustic wave travels down the optic fiber until it encounters a first acoustic absorber.

The first acoustic absorber stops the first flexural acoustic wave, but not before a grating is induced in the optic fiber. The acoustic absorbers may be made from any material that has a lower index of refraction than the material of the cladding to prevent disturbing the light in the cladding.

An optic signal encountering the first induced grating will be affected thereby. The user may have the first signal generator generate an AC signal or multiple AC signals that will induce a first grating to cause a particular wavelength, or set of wavelengths, of the optic signal to exit the core of the optic fiber and enter the cladding. The condition for mode conversion from core to cladding is when the acoustic wavelength resonates with the core and cladding modes of a particular wavelength.

The portions of the optic signal that enter the cladding and those portions that remain in the core travel down the optic fiber until a core blocker is encountered. The core blocker blocks any light in the core from travelling any further in the optic fiber and, essentially eliminates this unwanted wavelength, or set of wavelengths.

The light in the cladding continues down the optic fiber until it encounters a second acoustic absorber. The second acoustic absorber does not affect the light traveling in the cladding but does block a second flexural acoustic wave produced by a second silica horn further down the optic fiber.

The second silica horn is attached to a second acoustic transducer. The second acoustic transducer receives an electrical signal from a second signal generator. However, one signal generator may provide a signal to both acoustic transducers if the user can tolerate errors produced by mismatched components.

The RF modulating electrical signal from the second signal generator causes the second acoustic transducer to mechanically vibrate at the frequency of the electrical signal. The second silica horn then induces a second flexural acoustic wave in the optic fiber of the same frequency of the electrical signal of the second signal generator.

The second flexural wave travels down the optic fiber in the same direction of the light traveling in the optic fiber and is stopped by the buffer coating around the optic fiber. The second flexural acoustic wave induces a second grating in the optic fiber that may be identical to or different from the first grating induced by the first flexural acoustic wave. Any difference may be due to component mismatches if the user wishes to employ the same filtering scheme at the two flexural acoustic waves or any difference may be due to the user wishing to employ a different filtering scheme at the two flexural acoustic waves. Any differences may be compensated by adjusting the second RF signal frequency.

In an alternate embodiment, one acoustic absorber is used instead of two. Here, the core blocker is confined within the acoustic absorber.

DETAILED DESCRIPTION

Figure 1:
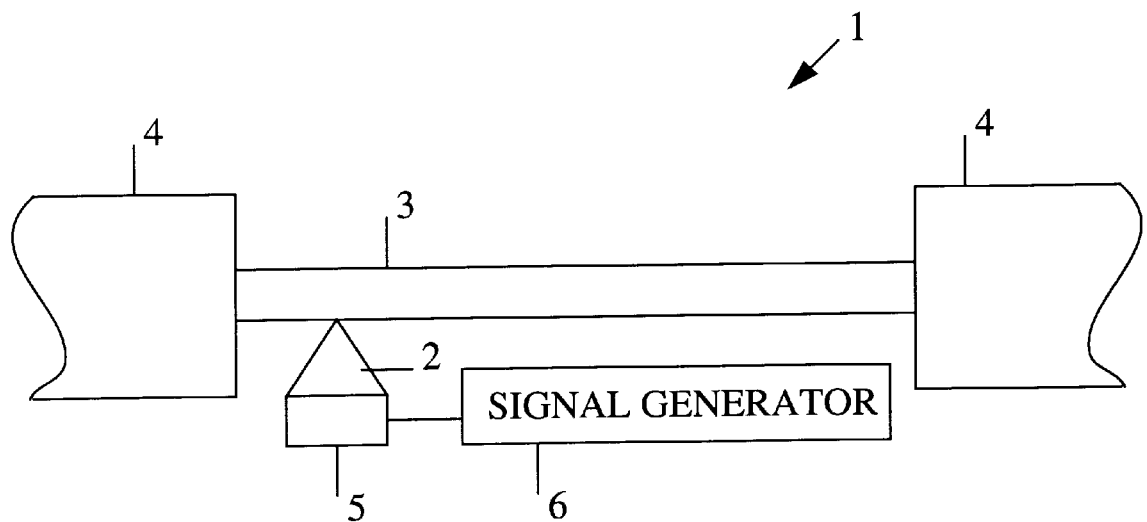
FIG. 1 is an illustration of a prior art wavelength-elimination type device.
Figure 2:
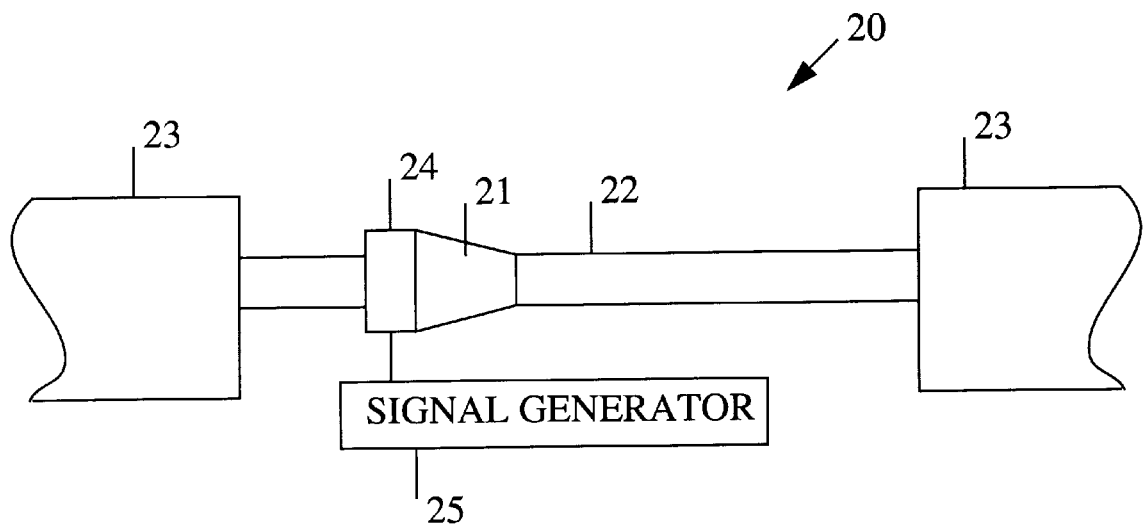
FIG. 2 is an illustration of a prior art wavelength-elimination type device with an in-line silica horn.
Figure 3:
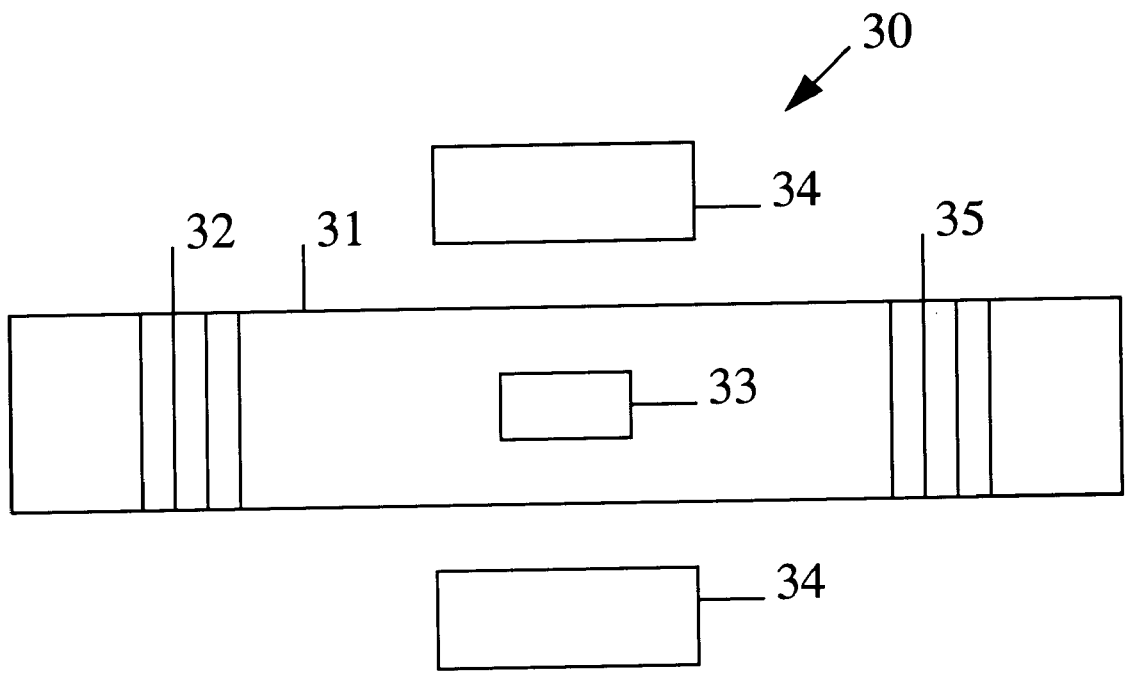
FIG. 3 is an illustration of a prior art bandpass filter that uses fixed gratings and modulator.
Figure 4:
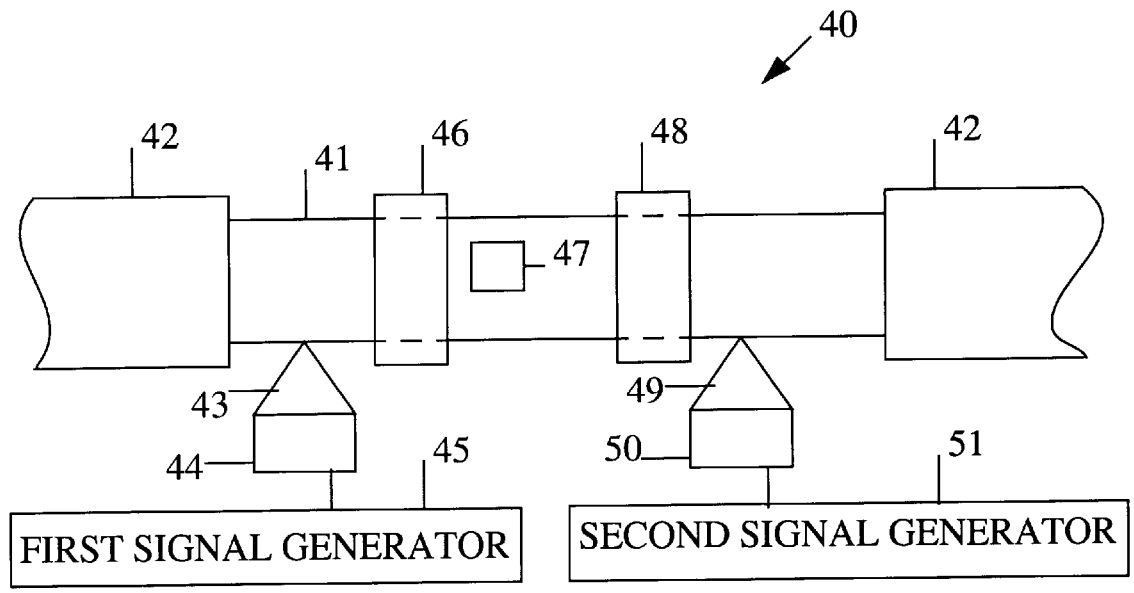
FIG. 4 is an illustration of the preferred bandpass filter of the present invention.

The present invention is a tunable optic fiber bandpass filter using flexural acoustic waves. FIG. 4 is an illustration of the preferred bandpass filter 40 of the present invention. The preferred bandpass filter 40 includes an optic fiber 41 through which travels an optic signal to be filtered. The optic fiber 41 may be a single-mode optic fiber or a multi-mode optic fiber. The single-mode optic fiber is preferred. The optic fiber 41 includes a core (not shown), a cladding (not shown) around the core, and a buffer coating 42 over portions of the optic fiber 41. There is no buffer coating 42 over those portions of the optic fiber 41 where bandpass filtering takes place.

A first silica horn 43 is attached to the optic fiber 41 where there is no buffer cladding 42. The silica horn 43 is, preferably, shaped as a cone with a pointed end and a wide end or base. The pointed end of the silica horn 43 is attached to the optic fiber 41. The first silica horn 43 should be placed near the buffer coating 42 closest to the first silica horn 43 to insure that only one flexural acoustic wave is created by the first silica horn 43 and that it travels in the same direction as the optic signal. If the buffer coating 42 is sufficiently displaced from the first silica horn 43 then a second unwanted flexural acoustic wave may be created that travels in the opposite direction as the optic signal. The first silica horn 43 may be attached to the optic fiber 41 using acoustic impedance matching epoxy. Silica horns are known in the field of optics and are commercially available or easily manufactured.

A first acoustic transducer 44 is connected to the base of the first silica horn 43. The first acoustic transducer 44 accepts an RF modulating electrical signal from a first signal generator 45 and converts the frequency of the electrical signal into a mechanical vibration having the same frequency. Piezoelectric transducers are commonly used as acoustic transducers, but any suitable acoustic transducer of the shear-mode type or the longitudinal-mode type may be used.

A mechanical vibration of the first acoustic transducer 44 induces a first flexural acoustic wave in the optic fiber 41 via the first silica horn 43 that is the same frequency of the RF modulating electrical signal of the first signal generator 45. The first flexural acoustic wave travels down the optic fiber 41 until it encounters a first acoustic absorber 46. The first acoustic absorber 46, which is deposited on the optic fiber 41, absorbs the first flexural acoustic wave and prevents it from traveling any further down the optic fiber 41.

The first acoustic absorber 46 must have a low index of refraction so that it does not affect (e.g., absorb) the light traveling in the optic fiber 41 but only stops (e.g., absorbs) the first flexural acoustic wave. The first acoustic absorber 46 must have a lower index of refraction than the cladding of the optic fiber 41 to allow light in the cladding to pass without interference. Epoxy may be used as a first acoustic absorber 46, but any other suitable material will do.

The placement of the first silica horn 43 and the first acoustic absorber 46 defines the length over which the first flexural acoustic wave flexes the optic fiber 41 and induces a first grating. The first induced grating is only present in the optic fiber 41 for as long as the first flexural acoustic wave is present. Therefore, the user has infinite, and independent, control over the first induced grating and may change it at will to suit the user's needs.

An optic signal encountering the first induced grating will be affected thereby. The user may have the first signal generator 45 generate an RF modulating electrical signal that will induce a first grating to cause any wavelength, or set of wavelengths, of the optic signal to exit the core of the optic fiber 41 and enter the cladding. The amount of insertion loss here is in the range of 0.2 dB. Also, the amount of RF power supplied by the first signal generator 45 to the first acoustic transducer 44 determines the amount of light of a particular wavelength that exits the core of the optic fiber 41 and enters the cladding. The first signal generator 45 is capable of controlling the amount of light of a particular wavelength being transferred from the core of the optic fiber 41 to the cladding by over 30 dB.

The portions of the optic signal that enter the cladding and those portions that remain in the core travel down the optic fiber 41 until a core blocker 47 is encountered. The core blocker 47 blocks any light in the core from travelling any further in the optic fiber 41 and, essentially eliminates this unwanted wavelength, or set of unwanted wavelengths. This is a major difference between the present invention and the prior art that uses flexural acoustic waves for optic signal processing.

In the prior art, the flexural acoustic wave is used to remove unwanted frequencies and wavelengths from an optic signal by causing those wavelengths to enter the cladding and be absorbed by the buffer coating. In the present invention, a first flexural acoustic wave is used to select the wanted wavelengths. In the present invention, a core blocker 47 is used to eliminate unwanted wavelengths. Therefore, the present invention operates in a complementary manner to the flexural acoustic-wave type devices of the prior art. The significance of this difference is that the present invention can perform the easier task of passing a band, or bands, of wanted wavelengths directly whereas the prior art devices have to perform the more difficult task of blocking all of the unwanted wavelengths. The present invention performs the function of a bandpass filter more easily, more directly, and more precisely since it is easier to select what you want rather than eliminate what you don't want. It is easier to define what you want, which is known, rather than eliminating those things that are present which are unwanted and which may be unknown.

It is known how to make a core blocker 47. One way is to locally heat the optic fiber 41 so that the core in the area where the core blocker 47 is desired is destroyed while leaving intact the cladding material that surrounds this area. Light in the cladding material may pass undisturbed, but light in the core may not. The light in the cladding material in the optic fiber 41 continues down the optic fiber 41 until it encounters a second acoustic absorber 48. The second acoustic absorber 48 is identical to the first acoustic absorber 46. The second acoustic absorber 48 does not affect the light traveling in the cladding of the optic fiber 41, but does block a second flexural acoustic wave produced by a second silica horn 49 further down the optic fiber 41. The second silica horn 49, which is identical to the first silica horn 43, is attached to a second acoustic transducer 50. The second acoustic transducer 50, which is identical to the first acoustic transducer 44, receives an RF modulating electrical signal from a second signal generator 51.

The second silica horn 49 should be placed as close to the second acoustic absorber 48 as the first silica horn 43 was placed to the buffer cladding 42. The second silica horn 49 must be orthogonal to the optic fiber 41 and oriented 0 degrees or 180 degrees with respect to the first silica horn 43. To extract the same wavelengths from the cladding as were extracted from the core, the second flexural acoustic wave must match the first flexural acoustic wave. To accomplish this, the distance between the second silica horn 49 and the buffer cladding 42 closest to the second silica horn 49 must be the same as the distance between the first silica horn 43 and the first acoustic absorber 46. If an epoxy is used to attach the first silica horn 43 and the second silica horn 49 to the optic fiber 41 then the epoxy must have an index of refraction that is lower than the index of refraction of the cladding of the optic fiber 41.

If the elements of the present invention could be matched perfectly or if the user can tolerate an error caused by mismatched components then only the first signal generator 45 is required. If the components matched perfectly, then the same RF modulating electrical signal may be supplied to the first acoustic transducer 44 and the second acoustic transducer 50. Since components typically do not match exactly, the frequency of the RF modulating electrical signal provided to the second acoustic transducer 50 must be slightly different than the frequency of the RF modulating electrical signal provided to the first acoustic transducer 44 if the user desires 100% efficiency (i.e., the wavelengths extracted from the core are the same wavelengths extracted from the cladding). Having a first signal generator 45 and a second signal generator 51 not only allows the user to bandpass filter a signal with 100% efficiency but also allows the user additional operational flexibility. For example, instead of being limited to one filtering scheme at both flexural acoustic waves, the user may employ a different filtering scheme at each flexural acoustic wave.

The RF modulating electrical signal from the second signal generator 51 causes the second acoustic transducer 50 to mechanically vibrate at the frequency of the RF modulating electrical signal. The second silica horn 49 induces a second flexural acoustic wave in the optic fiber 41 that is the same frequency of the RF modulating electrical signal. The amount of RF power of the electrical signal determines how much light enters the core from the cladding. The second flexural wave travels down the optic fiber 41 in the same direction of the light traveling in the optic fiber 41 and is stopped (e.g., absorbed) by the buffer coating 42 closest to the second silica horn 49. The second flexural acoustic wave induces a second grating in the optic fiber 41. The second flexural acoustic wave may be identical to the first flexural acoustic wave or they may be different. Any difference may be due to component mismatches if the user wishes to employ the same filtering scheme at the two flexural acoustic waves or any difference may be due to the user wishing to employ a different filtering scheme at the two flexural acoustic waves. Any difference may be compensated for my altering the frequency of the RF modulating electrical signal of the second signal generator 51. Gratings induced in this manner may be matched more closely than may fixed gratings which are impressed into an optic fiber and are difficult, if not impossible to recreate due to slight differences in the fiber core or misalignment during manufacturing.

The second induced grating causes the wanted wavelength, or set of wanted wavelengths, of light traveling in the cladding to enter the core of the optic fiber 41. The result is a bandpass filter 40 where the wanted wavelength, or set of wanted wavelengths, is selected and transmitted via the cladding using a first flexure acoustic wave. The unwanted wavelength, or set of unwanted wavelengths, is blocked in the core. The wanted wavelength, or set of wanted wavelengths, is transferred back to the core using a second flexural acoustic wave. The bandpass filter 40 may be turned on and off to AM modulate the bandpass filtered light.

Figure 5:
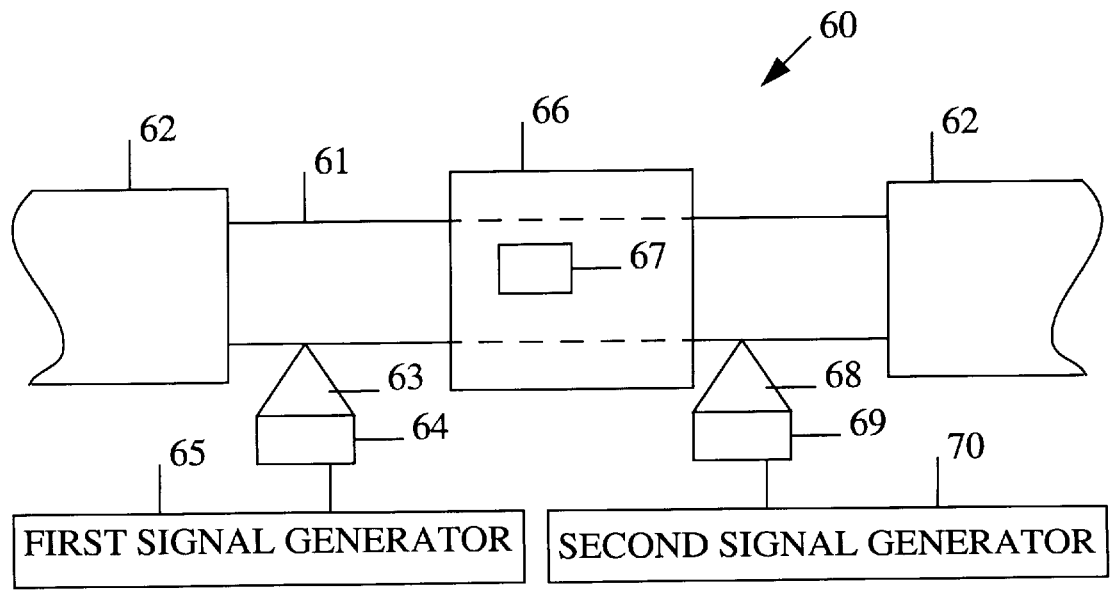
FIG. 5 is an illustration of an alternate bandpass filter of the present invention.

FIG. 5 is an illustration of an alternate embodiment of the bandpass filter 60 of the present invention. The bandpass filter 60 includes an optic fiber 61 over which travels an optic signal to be filtered. The optic fiber 61 may be a single-mode optic fiber or a multi-mode optic fiber. A single-mole optic fiber is preferred. The optic fiber 61 includes a core (not shown), a cladding (not shown) around the core, and a buffer coating 62 over portions of the optic fiber 61. There is no buffer coating 62 over those portions of the optic fiber 61 where bandpass filtering takes place.

A first silica horn 63 is attached to the optic fiber 61 where there is no buffer cladding 62, but sufficiently close to the buffer coating 42 to prevent a flexural acoustic wave from traveling in the opposite direction to light received by the optic fiber 61. The first silica horn 63 may be attached to the optic fiber 61 using acoustic impedance matching epoxy. Silica horns are known in the field of optics and are commercially available or easily manufactured.

A first acoustic transducer 64 is connected to the base of the first silica horn 63. The first acoustic transducer 64 accepts an electrical signal from a first signal generator 65 and converts the frequency of the electrical signal into a mechanical vibration having the same frequency. Piezoelectric transducers of the shear-mode type and the longitudinal-mode type are commonly used as acoustic transducers, but any suitable acoustic transducer may be used.

A mechanical vibration of the first acoustic transducer 64 induces a first flexural acoustic wave in the optic fiber 61 via the first silica horn 63 that is the same frequency of the RF modulating electrical signal of the first signal generator 65. The first flexural acoustic wave travels down the optic fiber 61 in the same direction as the optic signal received until it encounters an acoustic absorber 66 deposited on the optic fiber 61. The acoustic absorber 66 absorbs the first flexural acoustic wave and prevents it from traveling any further down the optic fiber 61. The placement of the first silica horn 63 and the acoustic absorber 66 defines the length over which the first flexural acoustic wave flexes the optic fiber 61 and induces a first grating. The first induced grating is only present in the optic fiber 61 for as long as the first flexural acoustic wave is present. Therefore, the user has infinite, and independent, control over the first induced grating and may change it at will to suit the user's needs. The acoustic absorber 66 must have a lower index of refraction than that of the cladding so that it does not affect (e.g., disturb) the light traveling in the optic fiber 61 but only stops (e.g., absorbs) the first flexural acoustic wave. Epoxy may be used as the acoustic absorber 66, but any other suitable material will do.

An optic signal encountering the first induced grating will be affected thereby. The user may have the first signal generator 65 generate an RF modulating electrical signal that will induce a first grating to cause any wavelength, or set of wavelengths, of the optic signal to exit the core of the optic fiber 61 and enter the cladding. The amount of insertion loss here is in the range of 0.2 dB. Also, the amount of RF power supplied by the first signal generator 65 to the first acoustic transducer 64 determines the amount of light of a particular wavelength that exits the core of the optic fiber 61 and enters the cladding. The first signal generator 65 is capable of controlling the amount of light of a particular wavelength being transferred from the core of the optic fiber 61 to the cladding by over 30 dB.

The portions of the optic signal that enter the cladding and those portions that remain in the core travel down the optic fiber 61 until a core blocker 67 is encountered. The core blocker 67 blocks any light in the core from travelling any further in the optic fiber 61 and, essentially, eliminates the unwanted wavelength, or set of wavelengths. This is a major difference between the present invention and the prior art that uses flexural acoustic waves for optic signal processing. The core blocker 67 is located within the confines of the acoustic absorber 66 so that the alternate embodiment bandpass filter 60 only requires one acoustic absorber 67 whereas the preferred embodiment 40 of FIG. 4 requires a first acoustic absorber 46 and a second acoustic absorber 48. The core blocker 67 of FIG. 5 may be constructed as is the core blocker 47 of FIG. 4.

The acoustic absorber 66 of FIG. 5 allows the light to continue down the optic fiber 61 undisturbed. The second flexural acoustic wave is produced by a second silica horn 68 which is further down the optic fiber 61. The second silica horn 68, which is identical to the first silica horn 63, is attached to a second acoustic transducer 69. The second acoustic transducer 69, which is identical to the first acoustic transducer 64, receives an RF modulating electrical signal from a second signal generator 70.

The second silica horn 68 is attached to the optic fiber 61 on the other side of the acoustic absorber 66 from where the first silica horn 63 is attached. The second silica horn 68 is attached to the optic fiber 61 with an epoxy that has a lower index of refraction than the cladding of the optic fiber 61. The second silica horn 68 must be attached to the optic fiber 61 sufficiently close to the acoustic absorber 66 to prevent a flexural acoustic wave from traveling in the opposite direction of the light. The second silica horn 68 must be orthogonal to the optic fiber 61 and oriented either 0 degrees or 180 degrees with respect to the first silica horn 63.

To extract the same wavelength of light from the cladding as was extracted from the core (i.e., 100% efficiency) the second flexural acoustic wave must be identical to the first flexural acoustic wave. To accomplish this, the distance from the first silica horn 63 to the acoustic absorber 66 must be the same as the distance from the second silica horn 68 to the buffer coating 62 closest to the second silica horn 68.

If the elements of the present invention could be matched perfectly or if the user can tolerate an error caused by mismatched components then only the first signal generator 65 is required. If the components matched perfectly, then the same signal may be supplied to the first acoustic transducer 64 and the second acoustic transducer 69. Since components typically do not match exactly, the frequency of the RF modulating electrical signal provided to the second acoustic transducer 50 must be different from the frequency of the RF modulating electrical signal provided to the first acoustic transducer 44. Having a first signal generator 65 and a second signal generator 70 not only allows the user to bandpass filter a signal with 100% efficiency by correcting for differences but also allows the user additional operational flexibility. For example, instead of being limited to one filtering scheme at both flexural acoustic waves, the user may employ a different filtering scheme at each flexural acoustic wave.

The RF modulating electrical signal from the second signal generator 70 causes the second acoustic transducer 69 to mechanically vibrate at the frequency of the RF modulating electrical signal. The second silica horn 68 then induces a second flexural acoustic wave in the optic fiber 61 of the same frequency of the RF modulating electrical signal of the second signal generator 70. The amount of RF power of the electrical signal determines how much light of a particular wavelength enters the core from the cladding. The second flexural wave travels down the optic fiber 61 in the same direction as the light and is stopped (e.g., absorbed) by the buffer coating 42 closest to the second silica horn 68. The second flexural acoustic wave induces a second grating in the optic fiber 61. The second flexural acoustic wave may be identical to the first flexural acoustic wave or they may be different. Any difference may be due to component mismatches if the user wishes to employ the same filtering scheme at the two flexural acoustic waves or any difference may be due to the user employing a different filtering scheme at the two flexural acoustic waves. Gratings induced in this manner may be matched more closely than can fixed gratings which are impressed into an optic fiber and are difficult, if not impossible, to recreate.

The second induced grating causes the wanted wavelength, or a set of wanted wavelengths, of light traveling in the cladding to enter the core of the optic fiber 61. The result is a bandpass filter 60 where the wanted wavelength, or a set of wanted wavelengths, is selected and transmitted via the cladding using a first flexure acoustic wave. The unwanted wavelength, or set of unwanted wavelengths, is blocked in the core. The wanted wavelength, or set of wanted wavelengths, is transferred back to the core using a second flexural acoustic wave.

What is claimed is:

1. A tunable optic fiber bandpass filter using flexural acoustic waves, comprising:

a) an optic fiber, having a core, having a cladding over the core, and having a buffer coating over the optic fiber where bandpass filtering does not occur;

b) a first silica horn, having a first end attached to the optic fiber where no buffer coating is present, and having a second end;

c) a first acoustic transducer attached to the second end of the first silica horn;

d) a first signal generator attached to the first acoustic transducer;

e) a first acoustic absorber deposited on the optic fiber at which no buffer coating is present and to the right of the first silica horn;

f) a core blocker fabricated within the core of the optic fiber at which there is no buffer coating present and to the right of the first acoustic absorber;

g) a second acoustic absorber deposited on the optic fiber at which there is no buffer coating and to the right of the core blocker;

h) a second silica horn, having a first end attached to the optic fiber where no buffer coating is present and to the right of the second acoustic absorber, and having a second end;

i) a second acoustic transducer attached to the second end of the second silica horn; and j) a second signal generator attached to the second acoustic transducer.

2. The device of claim 1, wherein said optic fiber is comprised of a step index optic fiber.

3. The device of claim 1, wherein said first silica horn and said second silica horn are attached to the optic fiber with acoustic impedance matching epoxy.

4. The device of claim 1, wherein said first acoustic absorber and said second acoustic absorber are both comprised of epoxy deposited on the optic fiber.

5. The device of claim 1, wherein said first acoustic transducer and said second acoustic transducer are both comprised of a piezoelectric material.

6. A tunable optic fiber bandpass filter using flexural acoustic waves, comprising:
  a) an optic fiber, having a core, having a cladding over the core, and having a buffer coating over the optic fiber where bandpass filtering does not occur;
  b) a first silica horn, having a first end attached to the optic fiber where no buffer coating is present, and having a second end;
  c) a first acoustic transducer attached to the second end of the first silica horn;
  d) a first acoustic absorber deposited on the optic fiber at which no buffer coating is present and to the right of the first silica horn;
  e) a core blocker fabricated within the core of the optic fiber at which there is no buffer coating present and to the right of the first acoustic absorber;
  f) a second acoustic absorber deposited on the optic fiber at which there is no buffer coating and to the right of the core blocker;
  g) a second silica horn, having a first end attached to the optic fiber where no buffer coating is present and to the right of the second acoustic absorber, and having a second end;
  h) a second acoustic transducer attached to the second end of the second silica horn; and
  i) a signal generator attached to the first acoustic absorber and the second acoustic transducer.

7. The device of claim 6, wherein said optic fiber is comprised of a step index optic fiber.

8. The device of claim 6, wherein said first silica horn and said second silica horn are attached to the optic fiber with acoustic impedance matching epoxy.

9. The device of claim 6, wherein said first acoustic absorber and said second acoustic absorber are both comprised of epoxy deposited on the optic fiber.

10. The device of claim 6, wherein said first acoustic transducer and said second acoustic transducer are both comprised of a piezoelectric material.

11. A tunable optic fiber bandpass filter using flexural acoustic waves, comprising:
  a) a step index optic fiber, having a core, having a cladding over the core, and having a buffer coating over the optic fiber where bandpass filtering does not occur;
  b) a first silica horn, having a first end attached to the optic fiber where no buffer coating is present, and having a second end;
  c) a first acoustic transducer attached to the second end of the first silica horn;
  d) a first signal generator attached to the first acoustic transducer;
  e) an acoustic absorber deposited on the optic fiber at which no buffer coating is present and to the right of the first silica horn;
  f) a core blocker fabricated within the core of the optic fiber at which there is no buffer coating present and within the confines of the first acoustic absorber;
  g) a second silica horn, having a first end attached to the optic fiber where no buffer coating is present and to the right of the second acoustic absorber, and having a second end;
  h) a second acoustic transducer attached to the second end of the second silica horn; and
  i) a second signal generator attached to the second acoustic transducer.

12. The device of claim 11, wherein said optic fiber is comprised of a step index optic fiber.

13. The device of claim 11, wherein said first silica horn and said second silica horn are attached to the optic fiber with acoustic impedance matching epoxy.

14. The device of claim 11, wherein said acoustic absorber is comprised of epoxy deposited on the optic fiber.

15. The device of claim 11, wherein said first acoustic transducer and said second acoustic transducer are both comprised of a piezoelectric material.

16. A tunable optic fiber bandpass filter using flexural acoustic waves, comprising:
  a) a step index optic fiber, having a core, having a cladding over the core, and having a buffer coating over the optic fiber where bandpass filtering does not occur;
  b) a first silica horn, having a first end attached to the optic fiber where no buffer coating is present, and having a second end;
  c) a first acoustic transducer attached to the second end of the first silica horn;
  d) an acoustic absorber deposited on the optic fiber at which no buffer coating is present and to the right of the first silica horn;
  e) a core blocker fabricated within the core of the optic fiber at which there is no buffer coating present and within the confines of the first acoustic absorber;
  f) a second silica horn, having a first end attached to the optic fiber where no buffer coating is present and to the right of the second acoustic absorber, and having a second end;
  g) a second acoustic transducer attached to the second end of the second silica horn; and
  h) a signal generator attached to the first acoustic transducer and the second acoustic transducer.

17. The device of claim 16, wherein said optic fiber is comprised of a step index optic fiber.

18. The device of claim 16, wherein said first silica horn and said second silica horn are attached to the optic fiber with acoustic impedance matching epoxy.

19. The device of claim 16, wherein said acoustic absorber is comprised of epoxy deposited on the optic fiber.

20. The device of claim 16, wherein said first acoustic transducer and said second acoustic transducer are both comprised of a piezoelectric material.

21. A method of bandpass filtering an optical signal using flexural acoustic waves, comprising the steps of:
  a) receiving an optic signal in a core of an optic fiber, where the optic fiber includes a cladding around the core, and a buffer coating around the cladding where bandpass filtering does not lake place;
  b) inducing a first flexural acoustic wave in the optic fiber where there is no buffer coating on the optic fiber;
  c) absorbing the first flexural acoustic wave after it has traveled a distance down the optic fiber and to the right;
  d) causing a user-definable frequency of the optic signal to exit the core and enter the cladding of the optic fiber by the first flexural acoustic wave;
  e) blocking portions of the optic signal that remain in the core of the optic fiber;

f) inducing a second flexural acoustic wave in the optic fiber where there is no buffer coating on the optic fiber and to the right of the first flexural acoustic wave;

g) absorbing the second flexural acoustic wave after it has traveled a distance down the optic fiber and to the left; and h) causing a user-definable frequency of the optic signal to exit the cladding and enter the core of the optic fiber by the second flexural acoustic wave.

22. The method of claim 21, wherein said step of receiving an optic signal in a core of an optic fiber is comprised of the step of receiving an optic signal in a core of a step index optic fiber.

23. The method of claim 21, wherein said steps of inducing a first flexural acoustic wave and a second acoustic wave in the optic fiber are both comprised of the step of inducing a first acoustic wave and a second acoustic wave in the optic fiber by vibrating the optic fiber.

24. The method of claim 21, wherein said step of absorbing the first flexural acoustic wave and second flexural acoustic wave are both comprised of the step of absorbing the first flexural acoustic wave and the second flexural acoustic wave by epoxy deposited on the optic fiber.

* * * * *